United States Patent [19]

Alamgir et al.

[11] Patent Number: 5,536,599
[45] Date of Patent: Jul. 16, 1996

[54] SOLID POLYMER ELECTROLYTE BATTERIES CONTAINING METALLOCENES

[75] Inventors: Mohamed Alamgir, Dedham; Kuzhikalail M. Abraham, Needham, both of Mass.

[73] Assignee: EIC Laboratories Inc., Norwood, Mass.

[21] Appl. No.: 242,793

[22] Filed: May 16, 1994

[51] Int. Cl.⁶ .............................. H01M 4/60; H01M 4/02
[52] U.S. Cl. .......................... 429/212; 429/192; 429/194
[58] Field of Search .................................. 429/192, 194, 429/212

[56] References Cited

U.S. PATENT DOCUMENTS

| | | | |
|---|---|---|---|
| 4,547,439 | 10/1985 | Geniès | 429/105 |
| 4,857,423 | 8/1989 | Abraham et al. | 429/194 |
| 5,219,679 | 6/1993 | Abraham et al. | 429/192 |
| 5,252,413 | 10/1993 | Alamgir et al. | 429/192 |
| 5,278,000 | 1/1994 | Huang et al. | 429/91 |

OTHER PUBLICATIONS

Gopaliengar, Munshi, and Owens "The Overcharge Behavior of Polymer Electrolyte Cells", in *Proceedings of the Symposium on Primary and Secondary Ambient Temperature Lithium Batteries* Edited by Gabano, Takehara, Bro. The Electrochemical Society, vol. 88–6, pp. 726–736, 1988 Month unavailable.

*Primary Examiner*—Stephen Kalafut
*Assistant Examiner*—Carol Chaney

[57] ABSTRACT

This invention pertains to the use of ferrocenes to provide both overcharge protection and Li dendrite-growth suppression in solid polymer electrolyte-based, rechargeable batteries having anodes of Li and Li-containing compounds. In particular, this invention pertains to the use of acetylferrocene and ferrocene carboxaldehyde in solid polymer electrolyte-based rechargeable batteries with anodes of Li and Li-containing compounds.

9 Claims, 4 Drawing Sheets

SOLID POLYMER ELECTROLYTE BATTERIES CONTAINING METALLOCENES

This invention was made with support from the U.S. Government under Contract F29601-92-C-0042 awarded by the Air Force. The Government has certain rights in this invention.

FIELD OF THE INVENTION

This invention pertains to improved electrochemical cells and more particularly to solid polymer electrolyte-based cells containing alkali metal negative electrodes (anodes), and especially lithium containing anodes. The improvement features the use of ferrocenes to provide both overcharge protection and suppression of Li dendrite growth in rechargeable solid polymer electrolyte batteries having anodes of lithium or Li-containing compounds.

BACKGROUND OF THE INVENTION

A typical solid-state lithium battery based on solid polymer electrolytes (SPE) consists of a SPE laminate sandwiched between a Li foil anode and a composite cathode laminate. The SPE serves as the separator as well as the medium through which ions are transported between the anode and the cathode. The electrode/electrolyte assembly is usually packaged in a metallized plastic envelope. In some versions of solid-state Li batteries, the anode comprises a compound of Li, such as Li intercalated carbon of the general formula, $Li_xC_6$, wherein the value of x is usually between 0.1 and 1. The solid polymer electrolyte can be one of several types and include: i) conventional electrolytes such as complexes of Li salts with long chain polymer hosts; for example, $LiClO_4$ complexes of poly (ethylene oxide), PEO, and ii) non-conventional electrolytes consisting of a Li salt solution, formed in an organic solvent (or a mixture of organic solvents), immobilized in a polymer matrix. Examples of the latter type of solid electrolytes include: a) that composed of 21 mole-percent polyacrylonitrile (PAN), 38 mole-percent ethylene carbonate (EC), 33 mole-percent propylene carbonate (PC) and, 8 mole-percent $LiClO_4$; and related electrolytes (U.S. Pat. No. 5,219,679 and U.S. patent application Ser. No. 08/048,683), and b) that composed of 15 weight-percent (w/o) poly(vinyl chloride), (PVC), 40 w/o PC, 40 w/o EC and 5 w/o $LiClO_4$ (U.S. Pat. No. 5,252,413). As described in these patent applications $Li/LiMn_2O_4$ and $C/LiMn_2O_4$ solid-state cells based on these non-conventional polymer electrolytes have been fabricated and cycled (discharged and charged). The $Li/LiMn_2O_4$ cells are cycled between the potential limits of 3.5 and 2.0 V and the $C/LiMn_2O_4$ cells are cycled between 4.2 and 2.0 V.

Unlike electrochemical cells containing aqueous electrolytes, those containing organic electrolytes, liquid- or polymer-based, may not be overcharged; that is, their potentials during charge may not be allowed to go beyond values where the full electrochemical oxidation of the cathode occurs. This is because overcharge can lead to electrochemical oxidation of the organic solvents and the process almost always is irreversible. Consequently, overcharging of an organic electrolyte-based cell can lead to its catastrophic failure. In the case of the aforementioned $Li/LiMn_2O_4$ and $C/LiMn_2O_4$ cells, electrolyte is oxidized at potentials ≧4.3 V versus $Li^+/Li$. When these electrochemical cells are cycled in the laboratory, their voltage limits are carefully controlled below these value by electronic cyclers to prevent overcharge. Electronic overcharge control usually comprises a sensing circuit which prevents current from flowing into the cell once the cell voltage reaches the value corresponding to full charge of the cell. However, a drawback of the use of electronic overcharge controllers as a battery component is that it lowers the energy density of the battery and increases its cost.

Overcharge control is also important when single cells are configured to form a battery. In this case, capacity balance among the cells in the battery may be lost, especially after repeated discharge/charge cycles. That is to say that the accessible capacity of individual cells may not remain equal. The reason is the following. When a battery possessing at least one cell with a lower capacity than the others is charged, the cathode potential of that cell will rise above the normal charge voltage limit. If the electrolyte is not stable at the higher potentials, oxidative degradation of the electrolyte will occur, and the cycle life of the battery will degrade at an accelerated rate. Even if the electrolyte does not decompose, the capacity of individual cells in the battery will increasingly get out of balance with each additional cycle. This is because the stronger cells will not be charged to their full capacity since the weaker cell contributes a larger fraction of the charge voltage of the battery. While electronic overcharge control circuits for each individual cell can mitigate the capacity imbalance problem in a battery, such devices will add significantly to the cost of the battery and decrease its energy density.

A better approach for controlling overcharge is to use a chemical redox shuttle. Here, a material with an appropriate oxidation potential is dissolved in the electrolyte. This material is unreactive until the cell is fully charged. Then, at a potential slightly above the normal charge cutoff voltage of the cell, the redox shuttle is electrochemically oxidized to products. The oxidized products diffuse to the anode where they are regenerated either by reduction or by chemical reaction. The reduced species are in turn oxidized at the cathode and thus a fixed potential is maintained at the cathode indefinitely, until charging is terminated. In other words, the cell potential during overcharge will be "locked" at the oxidation potential of the redox shuttle reagent.

Desirable properties of a redox shuttle include good solubility in the electrolyte, an oxidation potential slightly higher than the normal charge limit of the cell but lower than the oxidation potential of the electrolyte, ability to reduce the oxidized form of the reagent at the anode without side reactions, and chemical stability of both the oxidized and reduced forms of the reagent in the cell.

SUMMARY OF THE INVENTION

An object of this invention is to provide a means of chemical overcharge protection to secondary non-aqueous cells by the use of redox shuttle reagents.

The reactions which occur at the cathode and anode of a Li cell which contains the redox shuttle reagent, R, are depicted in equations [1–3].

$$R \rightarrow R^+ + e^-, \text{cathode} \quad [1]$$

$$R^+ + e^- \rightarrow R, \text{anode} \quad [2]$$

$$R^+ + Li \rightarrow R + Li^+, \text{anode} \quad [3]$$

Note that R, after being oxidized at the cathode, diffuses to the anode and is regenerated there either by reduction (equation [2]) or reaction with Li (equation [3]). Thus, addition to regenerating R, reaction [3] also scavenges the Li dendrites that are formed at the Li anode during charging of the cell. The oxidized R will preferentially react with Li dendrites since they have larger surface area, and therefore, are more reactive than the underlying Li foil in the anode. It is apparent that the reagents which are useful for overcharge protection of Li cells are also useful for scavenging the Li dendrites formed in a cell during cycling. If they are not removed Li dendrites would cause internal shorts and, consequently, would limit cell cycle life. The use of the redox reagent, therefore, will also increase the cycle life of secondary Li cells based on polymer electrolytes.

Accordingly, a second object of this invention is to provide a means of scavenging the Li dendrites that are formed in a solid polymer electrolyte cell containing Li anode, and prolong the cycle life of the cell.

DETAILED DESCRIPTION OF THE INVENTION

Figure 1:
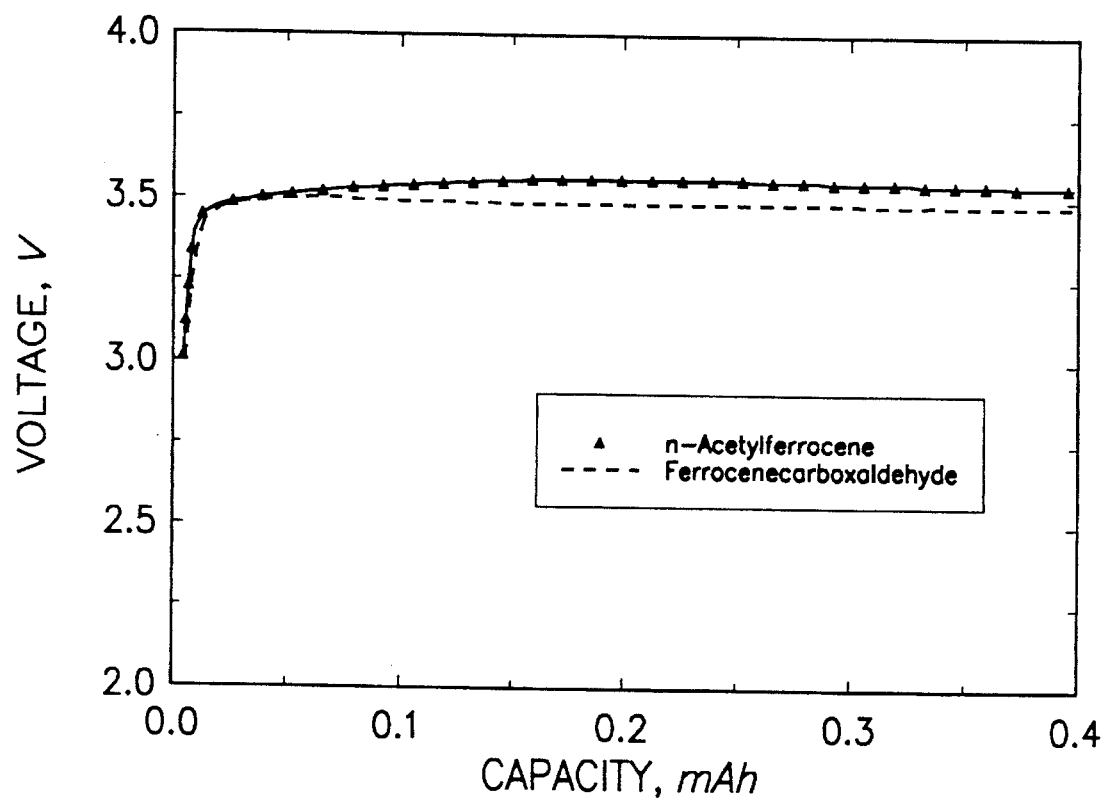
FIG. 1 depicts the oxidations of acetyl ferrocene and ferrocene carboxaldehyde in a solid polymer electrolyte cell. The positive electrode is carbon and the negative electrode is Li. The current density is 0.017 mA/cm$^2$.

The invention features a rechargeable solid-state electrochemical cell which includes an anode, a cathode, and a solid polymer electrolyte. The cell also contains a redox reagent, present, either in the cathode or in the solid polymer electrolyte, in an amount sufficient to provide adequate mass transport for maintaining a desired level of steady-state overcharge current in the cell.

A particular class of redox reagents for overcharge protection are metallocenes, in which cyclic π electron donors such as pentahaptobenzene (h$^5$-C$_5$H$_5$—) and hexahaptobenzene (h$^6$C$_6$H$_6$) and related molecules combine with metal atoms to form complexes of the general formula:

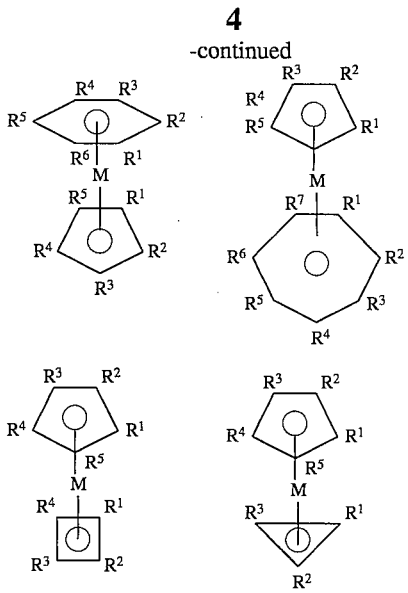

where M represents metals such as iron, cobalt, nickel, chromium and tungsten and R$^1$ through R$^6$ stand for H or alkyl groups such as methyl, ethyl or butyl. The usefulness of these materials for overcharge protection of secondary Li cells containing liquid electrolytes has been demonstrated by Abraham et at. in U.S. Pat. No. 4,857,423 (1989). The choice of a particular redox reagent will depend upon the cathode material used in the solid-state rechargeable Li cell. In order to be effective as a redox shuttle reagent, the oxidation potential of the metallocene reagent should be slightly higher than the potential at which the cell is to be charged to regain its full capacity. We have discovered that two ferrocene derivatives, acetyl ferrocene (I) and ferrocene carboxaldehyde (II) are particularly useful for both the overcharge protection and Li dendrite scavenging of polymer electrolyte-based solid-state batteries.

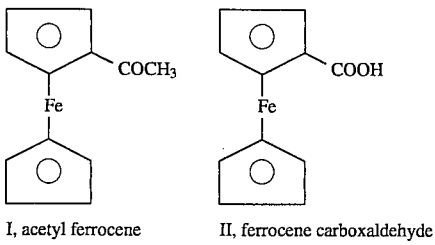

I, acetyl ferrocene    II, ferrocene carboxaldehyde

Both acetyl ferrocene and ferrocene carboxaldehyde are oxidized at about 3.5 V versus Li$^+$/Li which is the voltage limit for the charging of a Li/solid polymer electrolyte/ LiMn$_2$O$_4$ cell. Consequently, when this cell containing acetyl ferrocene is charged to or above 3.5 V, acetyl ferrocene will be oxidized. The oxidized acetyl ferrocene will diffuse to the anode where it will be regenerated. The regenerated acetyl ferrocene will then be reoxidized at the cathode. This cyclic redox process will "lock" the cell's potential at about 3.5 V, and prevent overcharge of the cell.

The reactions which are believed to occur when acetyl ferrocene is used for overcharge protection of solid polymer electrolyte batteries are given in the following reactions. At positive electrode (cathode):

acetyl ferrocene→(acetyl ferrocene)+e$^-$

At negative electrode (anode):

(acetyl ferrocene)$^+$e$^-$→acetyl ferrocene (acetyl ferrocene)$^+$+Li →acetyl ferrocene+Li$^+$ It can be seen that one of the ways in which the oxidized acetyl ferrocene is regenerated at the anode is by reaction with the Li dendrites that are formed at the anode during charging of the cell. Since the dendrites are removed in this manner in each cycle, they do not get an opportunity to grow from the anode to the cathode through the solid polymer electrolyte, and cause internal short circuit and failure of the cell. Consequently, Li/solid-polymer electrolyte/LiMn$_2$O$_4$ cells containing acetyl ferrocene exhibit significantly longer cycle life than those which do not contain this reagent.

Ferrocenes as a group have a range of oxidation potentials, depending upon the substituents on the cyclopentadiene ring (Abraham et al., U.S. Pat. No. 4,857,423). Consequently, different ferrocenes may be chosen for use in solid polymer electrolyte cells containing different cathodes. Alternatively, metallocenes other than ferrocenes such as nickelocene and cobaltocene may be used. The oxidation potential of nickelocene is 3.15 V versus Li$^+$/Li whereas that of cobaltocene is 2.13 V versus Li$^+$/Li. Thus, these metallocenes may be used in solid polymer electrolyte cells with low voltage cathodes. A principal requirement is that the metallocene has a slightly higher oxidation potential than the charging potential limit of the cell. In general, the ferrocenes may be used for the overcharge protection and Li dendrite scavenging of solid polymer electrolyte-based rechargeable Li cells containing cathodes such as TiS$_2$, V$_6$O$_3$, V$_5$, MoO$_3$, TiS$_2$, MoS$_2$, MoS$_3$, MoSe$_3$S, NbSe$_3$ and LiMn$_2$O$_4$. Soluble and partially soluble positive electrode materials may also be used, notably I$_2$, Br$_2$, Cl$_2$, SO$_2$, S, CuCl, CuCl$_2$, AgCl, FeCl$_2$, FeCl$_3$, and other transition metal halides. Other soluble positive electrode materials that may be used are lithium polysulfide (Li$_2$S$_n$) and organic compounds such as chloranil and fluoranil.

Both conventional and non-conventional polymer electrolytes can be used to fabricate the Li-polymer electrolyte cell. Conventional polymer electrolytes include Li salt complexes of poly(ethylene oxide), poly(propylene oxide), poly[bis((methoxy ethoxy)ethoxy) phosphazene] and other long chain polymer hosts which form ionically conductive Li salt complexes. Non-conventional polymer electrolytes include the PAN-based electrolytes described above, the poly(vinyl pyrrolidinone)-based electrolyte of U.S. Pat. No. 5,219,679 and poly(vinyl chloride)-based electrolyte of U.S. patent application Ser. No. 07/864,723.

The concentration of the Li salt in the solvent is not critical; it is only necessary to incorporate the minimum amount sufficient to yield the desired level of conductivity when the cell is fully charged. Lithium salts such as LiClO$_4$, LiAsF$_6$, LiBR$_4$ (where R=alkyl or aryl groups), LiPF$_6$, LiAlBr$_4$, LiAlCl$_4$, LiBF$_4$, LiN(SO$_2$CF$_3$)$_2$, LiSO$_3$CF$_3$ organic acids such as trichloroacetic, and formic acids can be used.

The redox shuttle reagents of this invention may be used where the anode essentially includes or is a material other than Li, e.g., sodium, potassium, magnesium, calcium or zinc or compounds of Li sodium and potassium such as Li$_x$C, Na$_x$C, and K$_x$C, and Li or sodium inserted oxides such as Li$_x$MoO$_2$, Li$_x$WO$_2$ and Na$_x$MoO$_2$ and Na$_x$WO$_2$.

The following illustrative examples further clarify the invention to those skilled in the art.

EXAMPLE 1

This example illustrates the redox shuttle behavior of acetyl ferrocene. A solid-state electrochemical cell was fabricated by sandwiching a polymer electrolyte laminate of the composition, 21 mole-percent PA/[38] 36 mole-percent EC/[38] 35 mole-percent PC/8 mole-percent LiClO$_4$, between a Li foil (1.2 mil thick) and carbon composite cathode.

The polymer electrolyte laminate was prepared in the following manner. A mixture of PAN, EC, PC and LiClO$_4$ taken in the ratio of 21 mole-percent; [38] 36 mole-percent; [38] 35 mole-percent; 8 mole-percent, was first heated to about 140° C. and the resulting homogeneous solution was poured onto a glass slide. A Teflon™ sheet (~2 rail thick) was placed on the viscous solution while it was being cooled to room temperature. Pressure was applied to the Teflon sheet with a roller to obtain an approximately 4 mil thick solid electrolyte membrane. The solid electrolyte had a conductivity of ~2×10$^{-3}$ ohm$^{-1}$·cm$^{-1}$ at 25° C.

The composite carbon electrode was prepared from a mixture of 5 weight-percent of PAN, 35 weight-percent of EC, 35 weight-percent PC and 6 weight-percent LiClO$_4$, and 19 weight-percent acetylene black carbon having a surface area of about 40 m$^2$/g. The composite cathode also contained 0.1M acetyl ferrocene.

The Li/carbon cell containing acetyl ferrocene was cycled at a constant current of 0.017 mA/cm$^2$. The voltage limit for discharge was 2.0 V while no voltage limit was set for charge. As it can be seen from FIG. 1, the cell maintained a constant charging voltage of ~3.6 V for a charge input considerably larger than that expected for a one-electron oxidation of acetyl ferrocene. For example, the amount of ferrocene present in the cathode was equivalent to 0.22 mAh, while the cell could be charged for greater than 0.8 mAh at a constant potential of 3.6 V. This implies that acetyl ferrocene is capable of acting as a chemical shuttle as illustrated in reactions 1–3. A chemical redox shuttle process is further substantiated by the fact that the discharge capacity following the long oxidation process (i.e., charging) is very small. That is the oxidized acetyl ferrocene is readily regenerated as in equations [2] and [3] leaving only an extremely small amount of it for reduction.

EXAMPLE 2

This example illustrates the redox shuttle behavior of ferrocene carboxaldehyde. A solid-state Li/carbon electrochemical cell was fabricated as in Example 1 by sandwiching the polymer electrolyte laminate between a Li foil and a composite carbon cathode. The cycling behavior of this cell at a constant current of 0.170 mA/cm$^2$ is also shown in FIG. 1 and the data demonstrate the redox shuttle behavior of ferrocene carboxaldehyde.

EXAMPLE 3

A Li/LiMn$_2$O$_4$ rechargeable solid-state cell was fabricated by sandwiching a polymer electrolyte laminate, prepared as in Example 1, between a Li foil and a LiMn$_2$O$_4$ composite cathode laminate. The composite cathode was composed of 51 weight-percent LiMn$_2$O$_4$, 41 weight-percent polymer electrolyte (of the same composition as the electrolyte laminate) and 8 weight-percent acetylene black carbon as an electronic conductivity enhancing additive. The cell was sealed in a metallized plastic envelope. The theoretical cell capacity was 6.1 mAh, which was the same as the theoretical cathode capacity. The Li anode capacity was significantly in excess of the cathode capacity.

Figure 2:
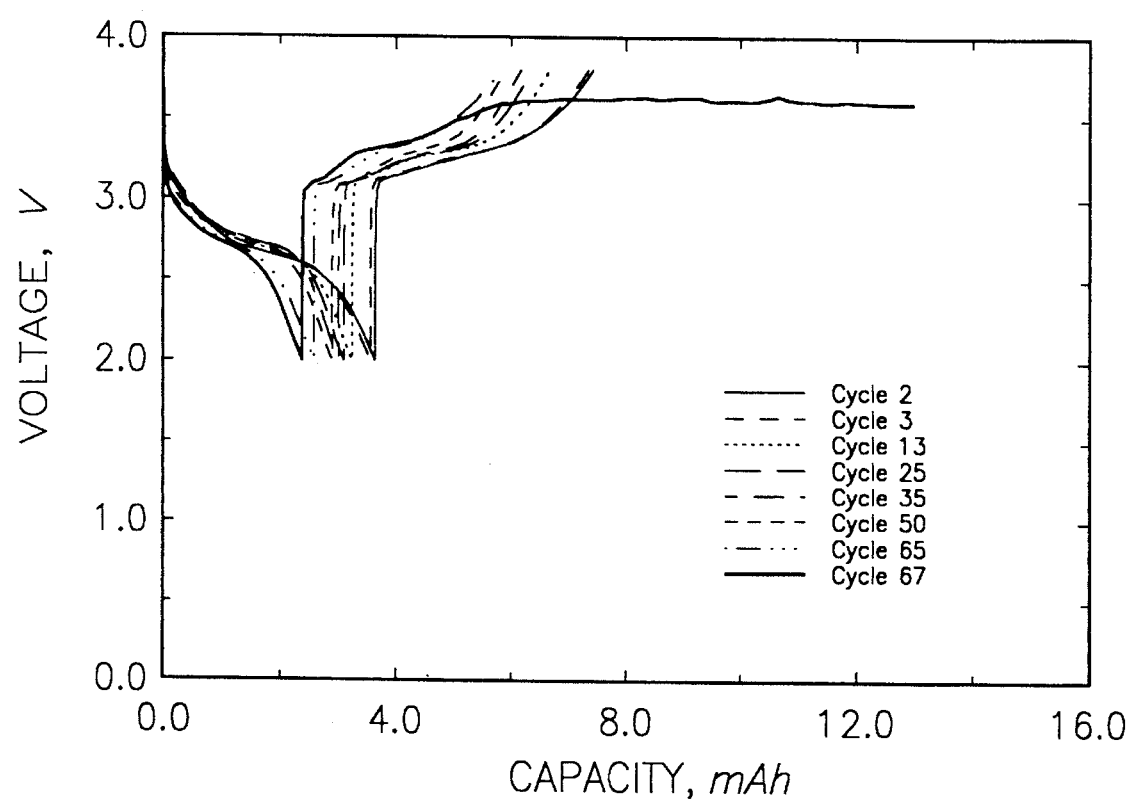
FIG. 2 depicts the cycling behavior of a Li/LiMn$_2$ solid state cell at 0.1 mA/cm$^2$ at room temperature between the voltage limits of 2.0 and 3.7 volts.

The cell was discharged and charged (cycled) at room temperature at a current density of about 0.1 mA/cm$^2$. The voltage limit for discharge was set at 2.0 V and 3.7 V for charge. The discharge/charge cycles are shown in FIG. 2. The cell was cycled 60 times at which time it developed an internal short due to Li dendrite bridging between the anode and the cathode. The cell failed after this.

EXAMPLE 4

This example illustrates the advantage of acetyl ferrocene for overcharge protection. A Li/LiMn$_2$O$_4$ rechargeable solid-state cell was fabricated by sandwiching a polymer electrolyte laminate, prepared as in Example 1, between a Li foil and LiMn$_2$O$_4$ composite cathode laminate. The composite cathode was composed of [51] 50 weight-percent LiMn$_2$O$_4$, [41] 40.3 weight-percent polymer electrolyte (which was the same composition as the electrolyte laminate) and [8] 7.9 weight-percent acetylene black carbon as an electronic conductivity enhancing additive. The cathode also contained 1.8 weight-percent acetyl ferrocene. The cell was sealed in a metallized plastic envelope. The theoretical cathode capacity was 5.7 mAh which was the same as the theoretical cell capacity. The Li anode capacity was significantly in excess of the cathode capacity.

The cell was discharged and charged at room temperature at a current density of about 0.1 mA/cm$^2$. The voltage limit for discharge was set at 2.0 V on the cycler while the charge limit was set at 3.7 V. The discharge capacity in the first cycle was 4 mAh, a 70% cathode utilization. In the charge half cycle, a plateau appears at about 3.6 V which is not observed in the cell of Example 3 which does not contain acetyl ferrocene. Because of this plateau at 3.6 V, due to acetyl ferrocene oxidation, the cell voltage during charge does not exceed 3.6 V (FIG. 3) and acetyl ferrocene thus prevents the overcharge of the cell.

EXAMPLE 5

This example illustrates the advantage of ferrocene carboxaldehyde. A Li/LiMn$_2$O$_4$ rechargeable solid-state cell was fabricated by sandwiching a polymer electrolyte laminate, prepared as in Example 1, between a Li foil and LiMn$_2$O$_4$, [41] 40.3. weight-percent polymer electrolyte (which was of the same composition as the electrolyte laminate), and [8] 7.9 weight-percent of acetylene black carbon as an electronic conductivity enhancing additive. The cathode also contained 1.8 weight-percent [acetyl] ferrocene carboxaldehyde. The cell was sealed in a metallized plastic envelope. The theoretical cathode capacity was 5.7 mAh which is the same as the theoretical cell capacity. The Li anode capacity was significantly in excess of the cathode capacity.

The cell was discharged and charged at room temperature at a current density of about 0.1 mA/cm$^2$. The voltage limit for discharge was set at 2.0 V on the cycler while the charge limit was set at 3.7 V. The discharge capacity in the first cycle was 4 mAh, a 73% cathode utilization. In the charge half cycle, a plateau appeared at about 3.6 V which was not observed in the cell of Example 3 which does not contain acetyl ferrocene. Because of this plateau at 3.6 V, due to acetyl ferrocene oxidation, the cell voltage during charge did not go beyond 3.6 V, and ferrocene carboxaldehyde thus prevented the overcharge of the cell.

EXAMPLE 6

This example illustrates the usefulness of acetyl ferrocene for Li dendrite scavenging of Li polymer electrolyte batteries.

Figure 3:
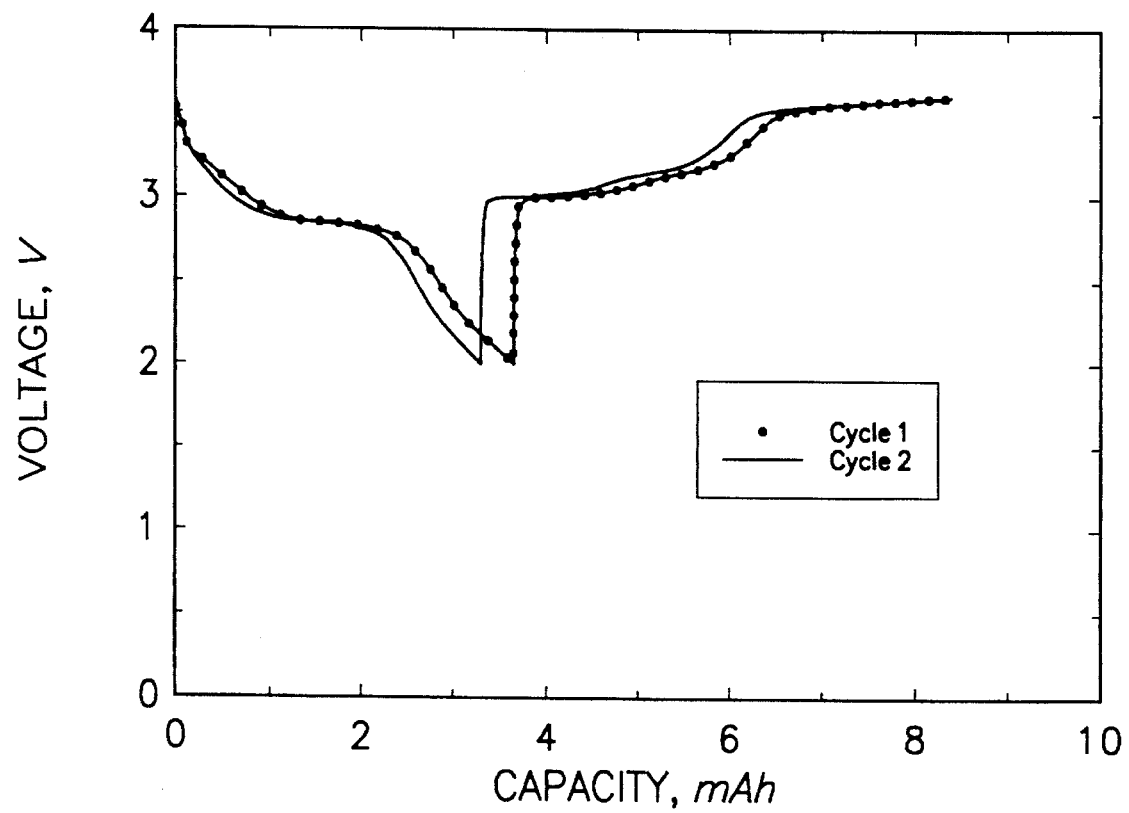
FIG. 3 depicts the cycling behavior with overcharge protection of a Li/solid polymer electrolyte/LiMn$_2$O$_4$ cell containing acetyl ferrocene. The cell was discharged and charged at 0.1 mA/cm$^2$.
Figure 4:
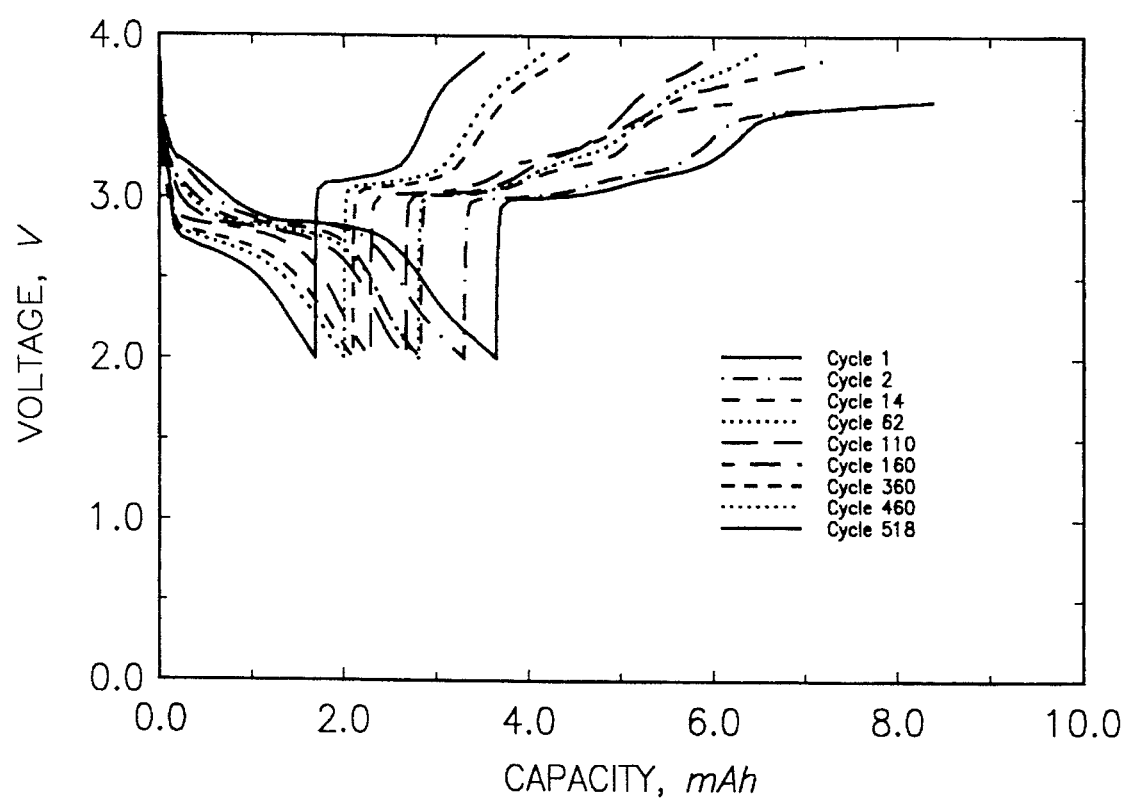
FIG. 4 depicts the long-term cycling behavior of a Li/solid polymer electrolyte/LiMn$_2$O$_4$ cell containing acetyl ferrocene. Current density is 0.1 mA/cm$^2$. The presence of acetyl ferrocene mitigates internal shorting and leads to long cycle life.

To demonstrate this, the cell described in Example 4 was subjected to long-term charge/discharge cycling. In each cycle the cell was charged to 3.6 V where acetyl ferrocene is oxidized to acetyl ferrocenium ion which diffuses to the anode and reacts with Li dendrites and scavenges them. As shown in FIG. 3, the cell was cycled more than 350 times without internal short-circuit. This is more than five times the cycle life of cells that do not contain acetyl ferrocene.

What is claimed is:

1. A rechargeable solid polymer electrolyte cell having an anode, a composite cathode and a solid polymer electrolyte separator which electronically isolates the anode and cathod while providing ionic transport across them, said composite cathode including an electroactive material, a solid polymer electrolyte and a redox reagent, wherein said redox reagent is a metallocene, said redox reagent being present in an amount sufcient to maintain proper mass transport for a steady overcharge protection and to prevent internal shorting by scavenging Li dendrites.

2. A rechargeable solid polymer electrolyte cell in accordance with claim 1 wherein said metallocene has cyclic electron donor molecules that combine with metal atoms to form complexes of the general formula:

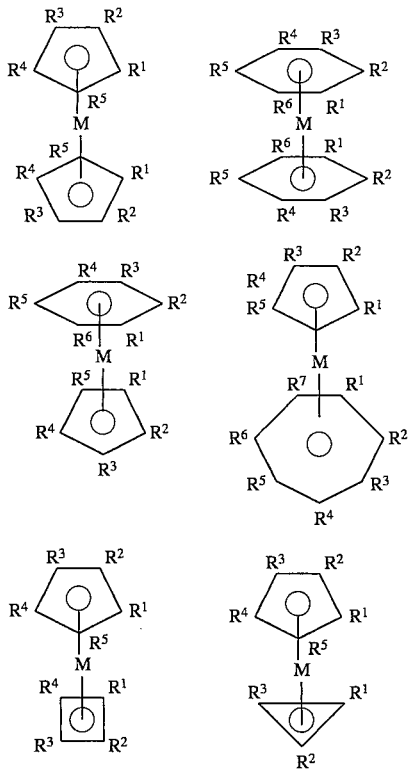

where M represents metals such as iron, cobalt, nickel, chromium and tungsten and R$^1$ through R$^6$ stand for H or alkyl groups from the group consisting of methyl, ethyl, butyl and propyl.

3. A rechargeable solid polymer electrolyte cell in accordance with claim 2 wherein said metallocene is from the group consisting of ferrocene, acetyl ferrocene and ferrocene carboxaldehyde having the following structural formulas:

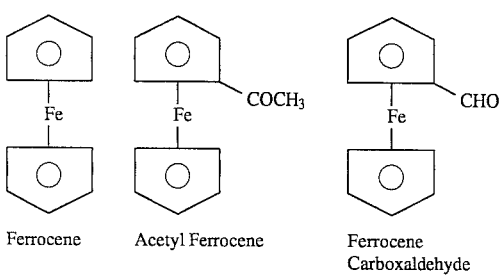

Ferrocene    Acetyl Ferrocene    Ferrocene Carboxaldehyde

4. A rechargeable solid polymer electrolyte in accordance with claim 1, wherein said anode is selected from the group consisting Li and carbon, and said electroactive cathode material is $LiMn_2O_4$.

5. A rechargeable solid polymer electrolyte cell in accordance with claim 1 wherein said anode is selected from a group consisting of Li and C and said cathode is $LiMn_2O_4$.

6. A rechargeable solid polymer electrolyte cell in accordance with claim 2 wherein said anode is selected from a group consisting of Li and C and said cathode is $LiMn_2O_4$.

7. A rechargeable solid polymer electrolyte cell in accordance with claim 3 wherein said anode is selected from a group consisting of Li and C and said cathode is $LiMn_2O_4$.

8. A rechargeable solid polymer electrolyte cell in accordance with claim 7 wherein said anode is selected from a group consisting of Li and carbon and said solid polymer electrolyte comprises a polymer host selected from polyacrylonitrile, poly(vinyl chloride) and poly(vinyl pyrrolidinone), a plasticizer consisting of an organic solvent selected from ethylene carbonate, propylene carbonate, butyrolactone, N-methyl pyrrolidinone sulfolane and mixtures thereof, and a Li salt selected from $LiAsF_6$, $LiClO_4$, $LiSO_3CF_3$, $LiN(SO_2CF_3)_2$, $LiPF_6$, $LiBF_4$, $LiC(SO_2CF_3)_3$ and mixtures thereof.

9. A rechargeable solid polymer electrolyte of claim 8 wherein the cathode is selected from $LiIMn_2O_4$, $TiS_2$, $Cr_{0.5}V_{0.5}S_2$, $V_6O_{13}$, $LiNiO_2$ and $LiCoO_2$ and $NbSe_3$.

* * * * *